United States Patent [19]
Combs

[11] 3,766,807
[45] Oct. 23, 1973

[54] CONTROLLED CONCENTRICITY CIRCULAR SAW FILING MACHINE

[76] Inventor: George N. Combs, 1234 S. University Ave., Fayetteville, Ark.

[22] Filed: Nov. 22, 1971

[21] Appl. No.: 201,070

[52] U.S. Cl................................ 76/31, 76/36
[51] Int. Cl................................ B23d 63/10
[58] Field of Search........................ 76/31, 36

[56] References Cited
UNITED STATES PATENTS
2,482,694   9/1949   Shearer.................................. 76/31
1,852,276   4/1932   Waller................................... 76/31

FOREIGN PATENTS OR APPLICATIONS
470,959   2/1929   Germany................................ 76/36

Primary Examiner—Leonidas Vlachos
Attorney—Head & Johnson

[57] ABSTRACT

This invention describes a saw filing machine for circular saw blades which includes means to mount the blade, a notched frame of hardened material to guide the file, pins to index the blade one tooth at a time so that each tooth comes, in turn, to the proper position for filing, a file fixture to preset the angle at which the surface of the file hits the tooth in a horizontal, vertical, and rotational angle. By this means the saw can be filed with each tooth exactly the same radius and the same angle.

9 Claims, 6 Drawing Figures

PATENTED OCT 23 1973 3,766,807

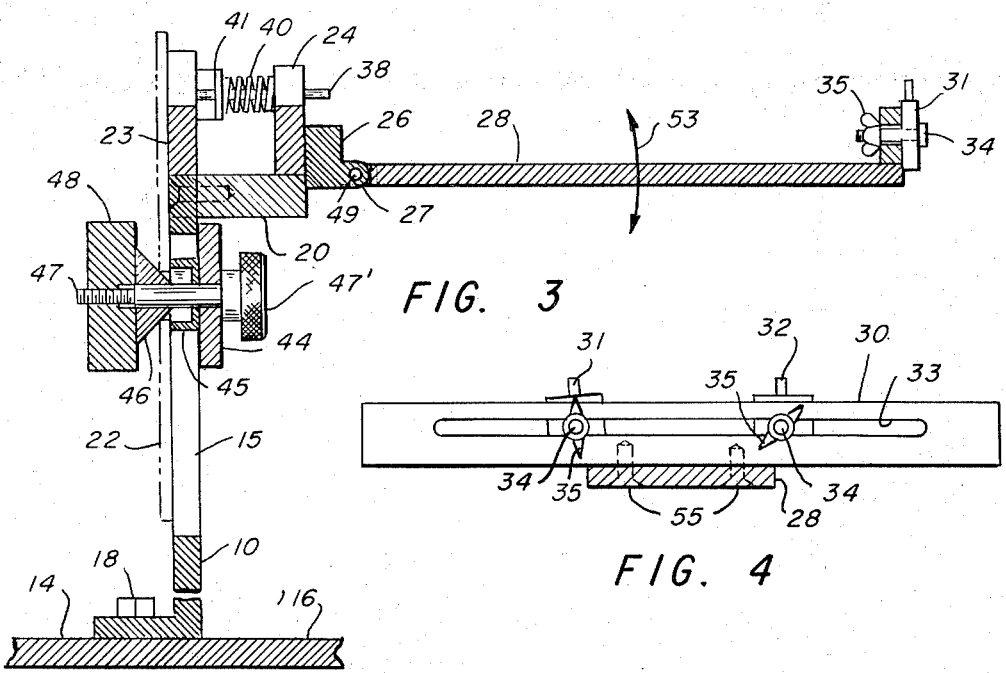
FIG. 3
FIG. 4
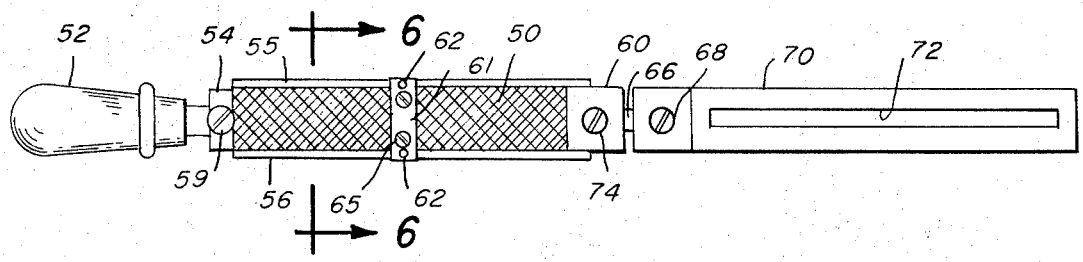
FIG. 5
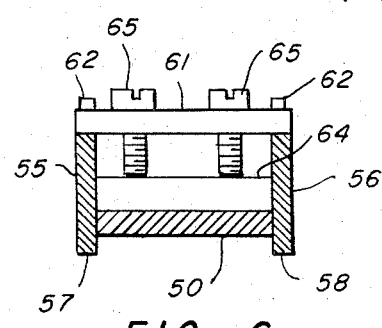
FIG. 6

//3,766,807

CONTROLLED CONCENTRICITY CIRCULAR SAW FILING MACHINE

BACKGROUND OF THE INVENTION

Existing saw filing equipment often consists simply of a bracket which holds the saw blade, such as a vice or equivalent, and means for mounting these parts on a bench. Normally, the circular saw blade is mounted on a threaded stud and is secured to the stud with a nut. The tops of the teeth of the circular saw blade and the angled frontal surfaces of the teeth are then filed with one or more proper size files.

The problems with these devices are that the tops of the teeth are filed by hand with no gauge or control over the angle of the filed surface, or the depth of the cut taken by the file. Thus, the height of each tooth is variable. When the front surfaces are filed, the angle of the files cut cannot be controlled. In order to have the saw blade make the smoothest cut and have the maximum blade life, these factors must be controlled. Also, beacuse of the lack of suitable guiding means the operator will find it takes a longer time to do the filing, since at each tooth he must decide how much to slant the file and how deep to make each cut.

Automatic machines also have their problems. Generally, they will not file a blade whose teeth are designed with an undercut, often called "canted" tooth. That is, the file will not come down at an angle, only radially to the blade. With automatic advances to the next tooth, registration is often uncertain. A tooth with a burr on it, or an irregularly shaped tooth can cause misalignment. This will allow the file to be dropped automatically in the wrong place on to the tooth before the operator can stop the machine, usually resulting in a damaged blade. Tooth registration that may be only slightly in error can cause the blade to be filed out of round. Once some of the teeth are cut to shorter radius, the blade must then be refiled to the radius of the shorter tooth, if clean saw cuts are to be obtained from the blade.

Also, automatic machines are not sufficiently portable to move regularly to a contractor's job site. Maintainence required to retain the necessary precision in the filing of the blades may be expensive, since these machines utilize things such as bearings, bushings, gears, gearboxes, belts, pulleys, and motors. One thing foremost in the mind of an individual who might file blades for profit, is the time spent filing a blade. With the filing machine of this invention an operator can file a blade faster than an automatic machine can, and with greater precision, when considering the lengthy setup time for each blade.

SUMMARY OF THE INVENTION

These limitations of the prior art devices are overcome in of this invention to provide a invention by providing a means for securely mounting the blade in a position where it is held fixed with regard to a specific filing area but can be turned and indexed very readily. There are hardened guide surfaces, which guide the file and act as a limit stop to the movement of the file in a specific direction. There are fixtrues, which can be preset, which control the angle of the file blade surface in a horizontal direction, a vertical direction, and in a rotational angular position. Thus, once set, each tooth on the blade is cut to the exactly same precise angle and to the exact precisely same depth.

It is therefore an object machine filing machine which is simple, inexpensive, easy to transport and provides means for precisely filing each tooth of a circular saw blade to the exact same radius and angle.

BRIEF DESCRIPTION OF THE DRAWINGS

These and other objects and an understanding of the principles of this invention will be evident from the following description, taken in conjunction with the attached drawings, in which:

FIG. 3 is a sectional elevational view taken along line 3—3 of FIG. 1.

FIG. 4 is a view taken along line 4—4 of FIG. 1.

FIG. 5 represents a file fixture for holding the file blade in proper position relative to the filing machine.

FIG. 6 is a cross section taken along the line 6—6 of FIG. 5.

DESCRIPTION OF THE PREFERRED EMBODIMENT

Figure 1:
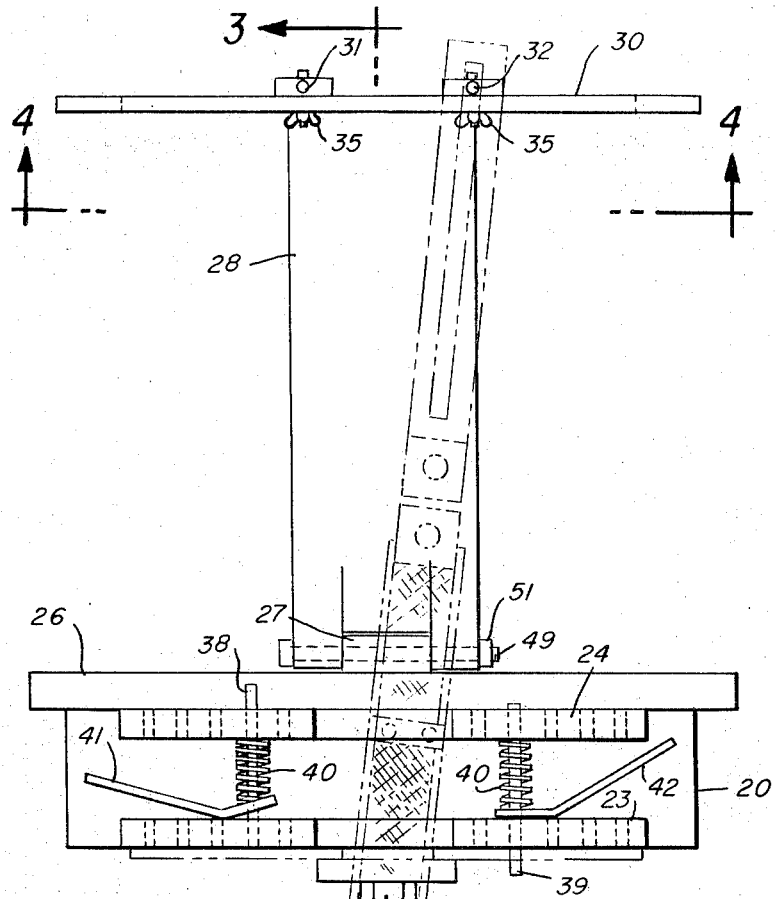
FIG. 1 represents a plan view of the embodiment of this invention.
Figure 2:
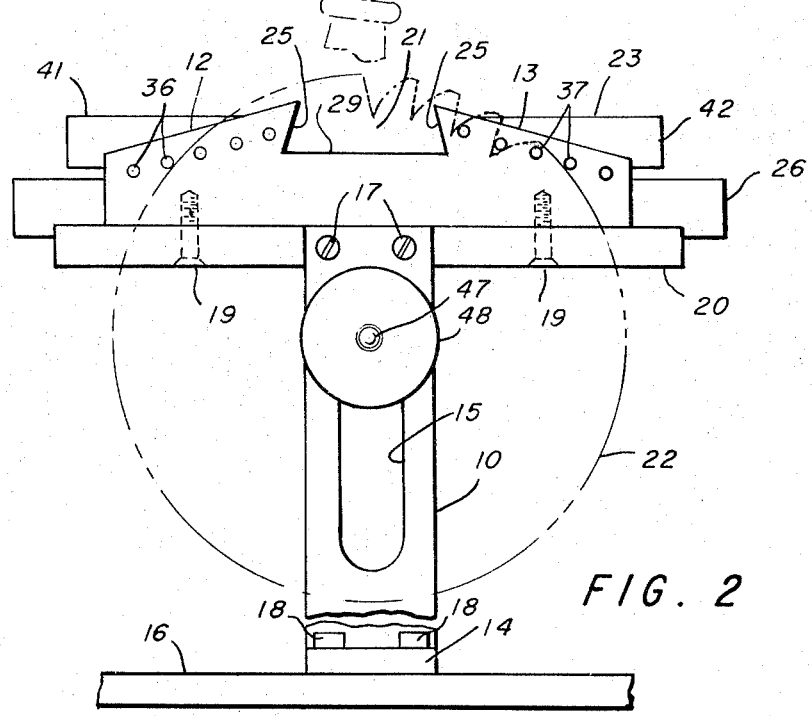
FIG. 2 is an elevation view of the same embodiment.

Referring now to the drawings, and in particular to FIGS. 1, 2, and 3, the embodiment involves an upright post 10 with a footing 14 adapted to be fastened to a base 16 by means of screws 18. This post 10 carries a platform 20 which is held in a horizontal position by means of screws 17. The platform 20 carries two spaced upright plates 23 and 24 which are of a partially triangular shape, which is clearly seen in FIG. 2. The shape provides a central notch 21 with a flat bottom surface 29 and two sloping edge surfaces 25. The two wings have sloping surfaces 12, 13 and there are two rows of spaced drilled holes 36 and 37 which follow generally the slope of the surfaces 12 and 13. The upright 24 is of lesser height than the corresponding upright 23, although the drilled holes 36 and 37 in upright 23 project through to corresponding holes in the upright 24. These are for the purpose of inserting pins 38 and 39, the purpose of which will be explained later.

Attached to the back of upright 24 is a plate 26 which has a projection 27. There is a horizontal arm 28 which is adapted to be hinged to this projection 27 and to be clamped at any desired angle according to the arrow 53, by means of a bolt 49 and nut 51. On the end of arm 28 opposite to the hinge there is an upright strip 30 fastened by means of screws 55. This strip has a horizontal slot 33 for the purpose of fastening the pins 31 and 32. These are upright pins fastened to plates 31', 32', which are held to the strip 30 by means of screws 34 and nuts 35. By means of the slot, these pins 31 and 32 can be moved to any position along the slot, and can be upright or can be tilted in either direction. Their purpose will be explained later.

Returning to FIG. 2, the post 10 has a long slot 15 along its vertical axis into which is fitted a cup 45 which is of such a diameter as to slide conveniently in the slot 15. The diameter of the cup is larger than the maximum diameter of the central openings of the blades 22. A shaft 47 has handle 47', and fits snugly into a washer 44, which presses against the back of the upright 10, through the cup 45, and through a conical member 46. A knurled nut 48 is threaded over the threaded end of the shaft 47. By tightening the nut 48, the blade 22 is accurately centered and held tightly by the cone, irrespective of the size of the central opening. The cone also provides a bearing for the rotation of the blade. By loosening the nut 48, the assembly, including the blade can be positioned to a selected vertical position in the slot. If desired, screw means can be provided, as is well known in the art, to precisely position the blade at any desired vertical position in the slot.

Referring now to FIGS. 5 and 6, there is shown a flat file 50. It is clamped at one end to a handle 52, by means of a fitting 54 which includes two parallel metal strips 55 and 56. The file blade is clamped to this fixture 54 by means of a screw 59. At the other end of the file blade is another fixture 60, to which it is clamped by means of screw 74. The two strips 55 and 56 are firmly attached to the fixtures 54 and 60 and are spaced apart sufficiently so that the file can be placed between them and be held securely by its ends. At approximately the mid point of this fixture there is a bar 61 which is fastened across the strip 55, 56 by means such as screws 62. Other screws 65 through the bar 61 serve, by means of a pad 64, to press against the file and to prevent it from bending under the pressure of the filing, and as a result, changing the possible depth or angle of the cut. The fixture 60 has a longitudinal pin 66 which is fastened to a separate fixture 70. This comprises a strip with a longitudinal slot 72. This fixture 70 is clamped to the pins 66 by means of screw 68, such that the angle between the plane of the file blade and the strips 70 can be changed. The slot 72 in the strip 70 is adapted to fit over the pins 31 and 32, and to take the angle of the pins as they are clamped by screws 34 and nut 35 to the strip 30.

Shown in dashed form in FIG. 1, overlaid on the plan view of the filing machine, is a file and corresponding fixtures 54, 60 and 70. The undersurfaces 57 and 58 (FIG. 6) of the strips 55 and 56 are hardened and extend beyond the surface of the file 50. These edges 57 and 58 are individually, or together, adapted to slide along the surfaces 29 or 25, or the top edges of 12 or 13, as may be dsirable, according to the angle of the file, as set by the angle 53 of arm 28, the lateral positions of the pins 31 or 32 and their particular angular setting. Thus, there is complete freedom to set the plane of the file surface in horizontal angle, vertical angle, and rotational angle. It is desired to have the same final cut on each saw tooth. As the file is operated and the tooth is gradually cut down, the filing will stop whenever the runner 57 or 58 contacts the hardened surfaces 25, 29 12 or 13. This acts as a positive stop so that a given tooth cannot be undercut. Now by rotating the blade to bring another tooth into position the exactly same cut can be applied to that tooth, and so on. It is important, of course, that the saw tooth be indexed properly so that every tooth as it approaches position for filing will be situated in the exactly same spot, so with the preset angles and positions it will have the proper cut at the proper angle and to the proper radial depth.

The pins 38 and 39, one or the other, or both, can seve as index pins against which position the saw blade. A number of possible positions for the pins are provided so that no matter what the size or type of saw blade, there will be at least one position for one pin that will be correct for the cutting of the teeth. As is evident from FIG. 1, the pins are held in psition in a forward position by means of springs 40 and can be retracted by the small levers 41 and 42 so that one or the other or both pins can be in position to index the saw. Also, by retracting the pins, they can be slipped out of the holes 36 or 37 and positioned into other holes, as needed. In operation it is preferred that the tooth to be filed be placed immediately adjacent the indexing pin.

While FIG. 6 shows only a flat file, it will be clear that other types of files, such as a three-cornered file, or a convex file, for example, can be fitted into a corresponding fixture similar to that of FIG. 6 and used in the same way.

For those cuts where a precise angle of the file is required, the pins 31 and fixture 70 are useful. However, when filing the tops of the teeth, the angle of the cut is derived from the guide surfaces 57, 58 resting on 13, for example. In such case the fixture 70 can comprise simply a long rod, and the matching fixture can be a hole in the plate 31, (instead of a pin) clamped to strip 30.

Also by means of the slot 15, the vertical position of the blade can be adjusted so that the top ends of the teeth are at a desired level compared to the guide surfaces of notch 21.

In FIGS. 1, 2, and 3 the embodiment as mounted on a table 16 with the blade essentially in a vertical position, and the arm 28 tiltable upwardly or downwardly by means of hinge pin 49. It has been found convenient in certain cases to mount the arm 28 on the top of a table, with the upright 10 and blade hanging from the hinge in front of the table. The angle of cut of the blade is then adjusted by tilting the arm 10, the file blade being substantially horizontal. Other configurations will also be found useful all of which are considered to be part of this invention.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the dependent claim or claims, including the full range of equivalency to which each element or step thereof is entitled.

What is claimed:

1. An improved saw filing machine comprising:
    a. a frame;
    b. support means on said frame for supporting a circular saw blade for rotation on said frame; said support means movable to accommodate blades of different diameter;
    c. adjustable index pins on said frame for indexing said blade to position each tooth successively to a selected position on said frame for filing;
    d. guide surfaces on said frame in selected positions in relation to the position of said tooth; and
    e. file fixture means for holding a file, said fixture including guide surfaces for cooperation with said guide surfaces on said frame so as to maintain a fixed relation between the plane of said file and a tooth on said blade in said selected position.

2. The saw filing machine as in claim 1 in which said guide surfaces on said frame include a central notch at the top of said frame.

3. The saw filing machine as in claim 2 and including an arm hingedly mounted to and extending backwardly of said frame; said arm carrying at its free end at least one pin adjustable in lateral position and angle, said pin adapted to cooperate with guide means on said file fixture.

4. The saw filing machine as in claim 1 in which said file fixture means includes a slotted strip extending longitudinally beyond the end of the file, said slotted strip adapted to cooperate with said pin means on said frame.

5. The saw filing machine as in claim 4 including side rails clamping said file, the edges of said rails adapted to serve as guide surfaces.

6. An improved saw filing machine comprising:
 a. a frame including an upright support means for holding a circular saw blade for rotation, including means for vertical positioning of said saw blade;
 b. a platform at the top of said support means supporting two upright strips spaced apart, a central notch in the top of said uprights, the bottom and sides of said notch adapted to serve as guides for a file;
 c. a series of spaced holes along the top of said uprights to hold at least one pin means in any one of said holes, and including spring means to cause said pin means to project to the front of said uprights, whereby said pin means can act as an indexing means to successively position each tooth in a selected position opposite said notch;
 d. an arm extending to the rear of said frame and hinged to the back of said platform, and means to lock said arm in any selected angular position relative to a horizontal position, and slotted upright means fastened at the distal end of said arm;
 e. file fixture means for holding a file, said fixture including a slotted strip extending longitudinally beyond the end of said file, said fixture including guide surfaces for cooperation with the guide surfaces in said notch; and
 f. pin means adjustably positionable along the slot of said slotted upright, adapted to cooperate with the slot in said slotted strip of said file fixture, to guide the motion of said file.

7. The saw filing machine as in cliam 6 in which said means for holding a circular saw blade comprises a circular cup means and a coaxial conical means, said blade means being held coaxially between said cup and said cone, and including screw means to hold said parts tightly together.

8. The saw filing machine as in claim 6 in which said index pin is placed immediately adjacent the tooth to be filed.

9. The saw filing machine as in claim 1 in which said file fixture means includes a circular rod extending longitudinally beyond the end of the file, said rod adapted to cooperate with circular opening means on said frame.

* * * * *